United States Patent
Storinsky et al.

(10) Patent No.: US 7,240,954 B2
(45) Date of Patent: Jul. 10, 2007

(54) SPORT BAR CLOSE OUT SEAL

(75) Inventors: Larry M Storinsky, Rochester Hills, MI (US); Martin Potok, Milford, MI (US); Douglas P Smith, Clarkson, MI (US); Daniel Bullion, Milford, MI (US); John Griffin, Davisburg, MI (US); David Baryla, Orion Township, MI (US); Michael Boes, Orion Township, MI (US); Jeffrey Tangen, Shelby Township, MI (US); John Grauer, Troy, MI (US); Richard Maciejewski, Wixom, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 91 days.

(21) Appl. No.: 11/270,150

(22) Filed: Nov. 8, 2005

(65) Prior Publication Data

US 2006/0097531 A1 May 11, 2006

Related U.S. Application Data

(60) Provisional application No. 60/626,521, filed on Nov. 10, 2004.

(51) Int. Cl.
*B60R 13/02* (2006.01)
*B60J 10/04* (2006.01)
(52) U.S. Cl. .............................. 296/146.16; 296/1.08; 296/181.4; 280/756
(58) Field of Classification Search ........... 296/146.16, 296/1.08, 181.4; 280/756
See application file for complete search history.

(56) References Cited

U.S. PATENT DOCUMENTS 2,160,038 A * 5/1939 Simpson ................ 296/146.16
4,711,485 A * 12/1987 Maebayashi et al. ....... 296/108
5,527,081 A * 6/1996 Rausch et al. ............. 296/39.1

* cited by examiner

*Primary Examiner*—Dennis H. Pedder
(74) *Attorney, Agent, or Firm*—Ralph E. Smith

(57) ABSTRACT

A close out seal has a base, a weather strip and a trim strip all permanently joined together to provide a single part capable of being readily installed in a rear quarter panel of an automotive vehicle. The weather strip has a sealing lip adapted to contact a rear window of the vehicle. The trim strip has a contoured inner surface portion adapted to seal around an upright end portion of a transverse overhead sport bar. The trim strip provides a cap for the rear quarter panel.

10 Claims, 5 Drawing Sheets

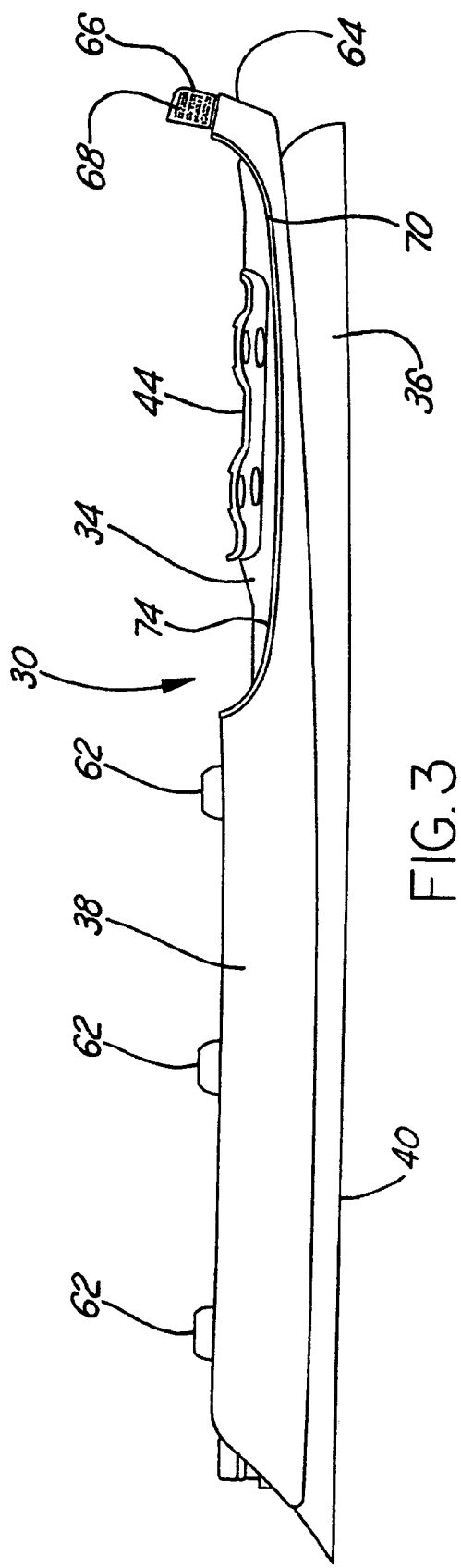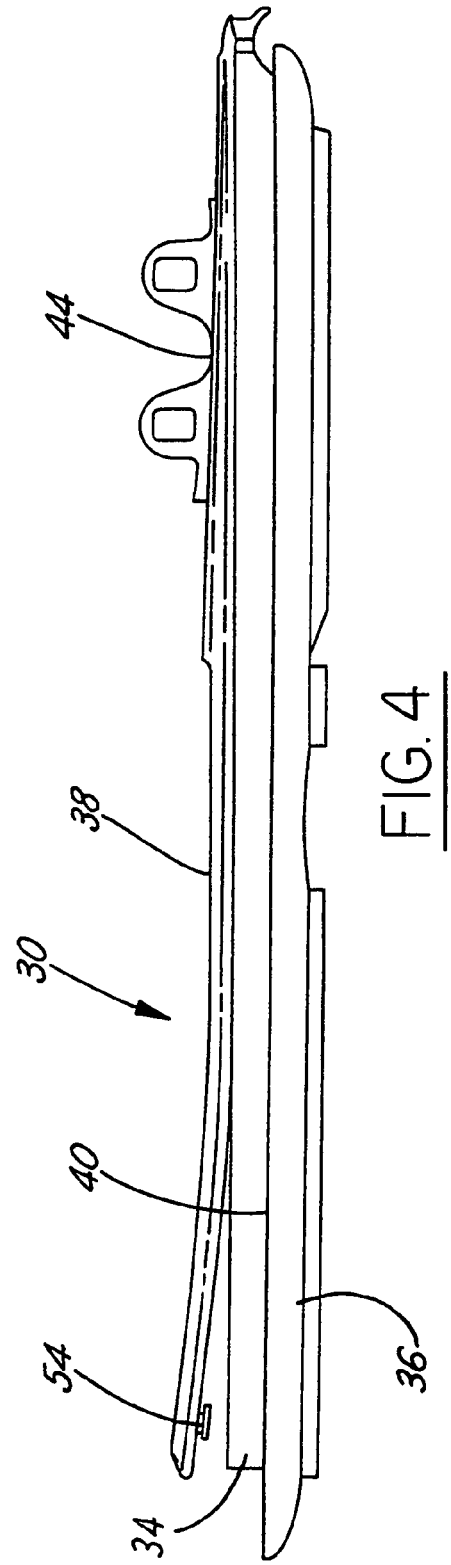

SPORT BAR CLOSE OUT SEAL

CROSS REFERENCE TO RELATED APPLICATION(s)

This invention claims the benefit of Provisional Patent Application Ser. No. 60/626,521, filed Nov. 10, 2004.

FIELD OF THE INVENTION

The present invention relates to close out seals for the rear quarter panels of automotive vehicles.

BACKGROUND OF THE INVENTION

Road noise and dust intrusion entering the passenger compartment of an automotive vehicle is a problem, particularly in the rear quarter panel area of a convertible-type vehicle. Typically, such vehicles have a transverse overhead cross bar, often referred to as a sport bar. Rear quarter panel close out seals in current use require several individual parts, namely a sport bar close out trim, a rear inner belt seal, and a sport bar seal to glass. The use of several different parts to close out the areas in question creates assembly, quality and aesthetic issues.

SUMMARY OF THE INVENTION

This invention combines the sealing lip and surface area of the rear inner belt seal and the sport bar seal into one continuous seal and carrier with a unique cross car hinge feature allowing all build variations to be accommodated in one part. This invention also combines an interior hard trim cover integrated into the seal and unique process installations attaching this part to the rear inner quarter trim, sport bar, and rear window regulator all at once.

The close out seal of the present invention preferably comprises an elongated base adapted to be mounted on supporting frame structure of the vehicle. A weather strip is secured to the base, having a sealing lip adapted to contact a rear window of the vehicle. A trim strip is secured to the base, having a contoured inner surface portion adapted to seal around an upright end portion of the sport bar. The trim strip provides a finished cap for the rear quarter panel. The base, weather strip and trim strip are permanently joined together to provide a single part capable of being readily installed in the rear quarter panel of the vehicle. The contoured inner surface portion of the trim strip is preferably lined with a non-abrasive material so as not to scratch the trim cover on the sport bar during installation.

One object of this invention is to provide a rear quarter panel close out seal which combines the features of several parts into a single unit with improved function, fit, finish, sealing and reduction of noise to the interior of the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a top view of the close out seal;

FIG. 4 is a side view of the close out seal with the rear end portion of the trim strip displaced upwardly to show a prong on the trim strip for locking it down on the base;

DETAILED DESCRIPTION OF THE PREFERRED EMBODIMENT

The following description of the preferred embodiment is merely exemplary in nature and is in no way intended to limit the invention, its application, or uses.

Figure 1:
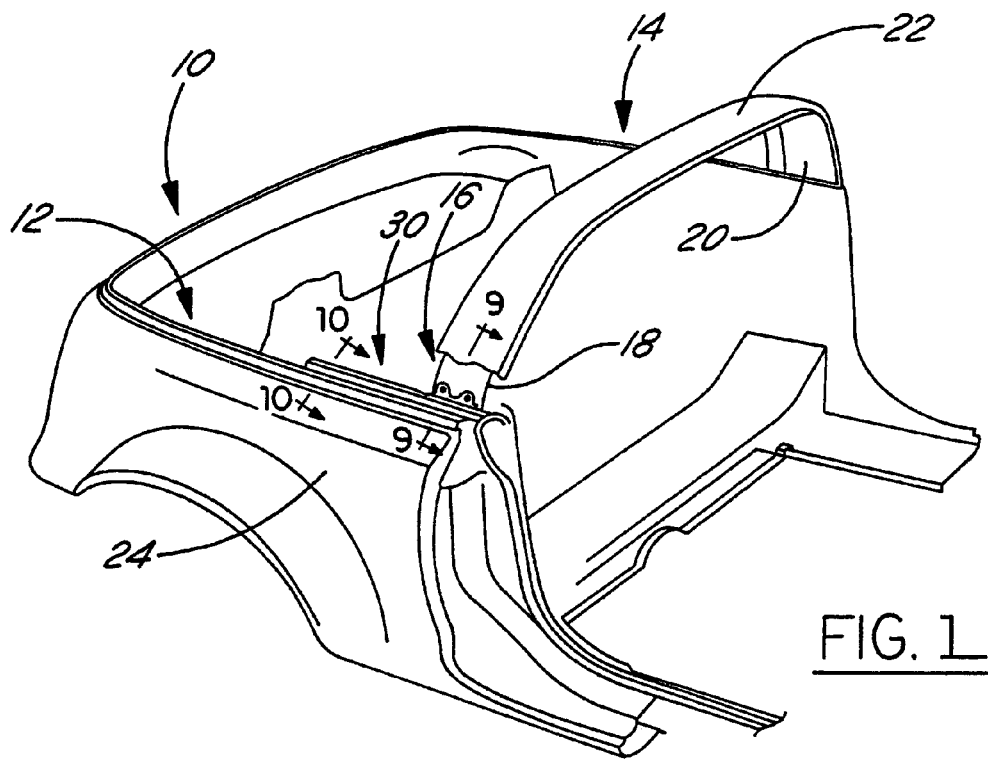
FIG. 1 is a perspective view of a rear portion of a convertible-type automotive vehicle body frame, showing the close out seal for one of the rear quarter panels.
Figure 2:
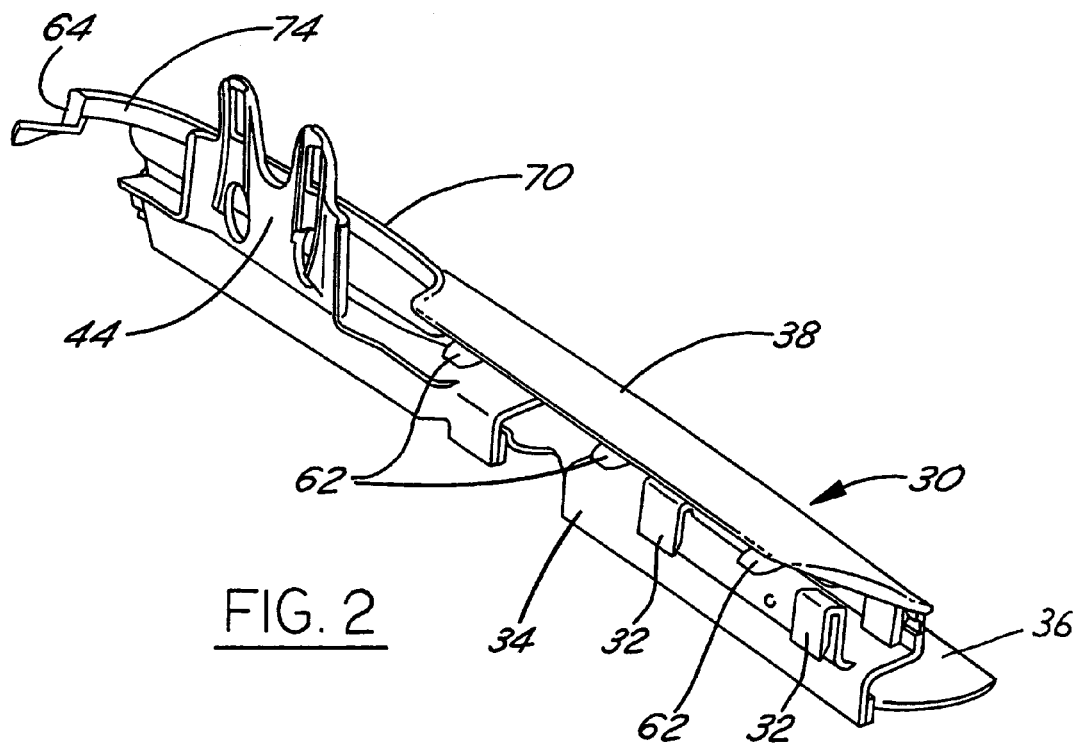
FIG. 2 is a perspective view of the close out seal.
Figure 5:
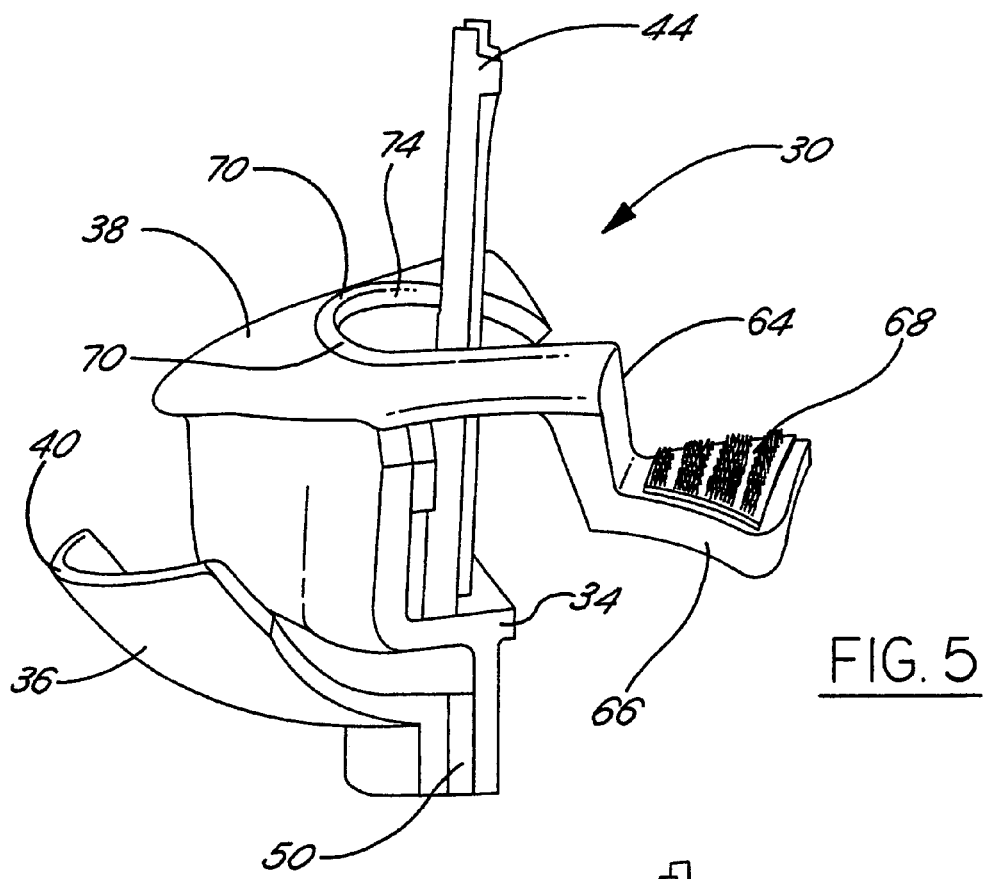
FIG. 5 is a front end view of the close out seal.
Figure 6:
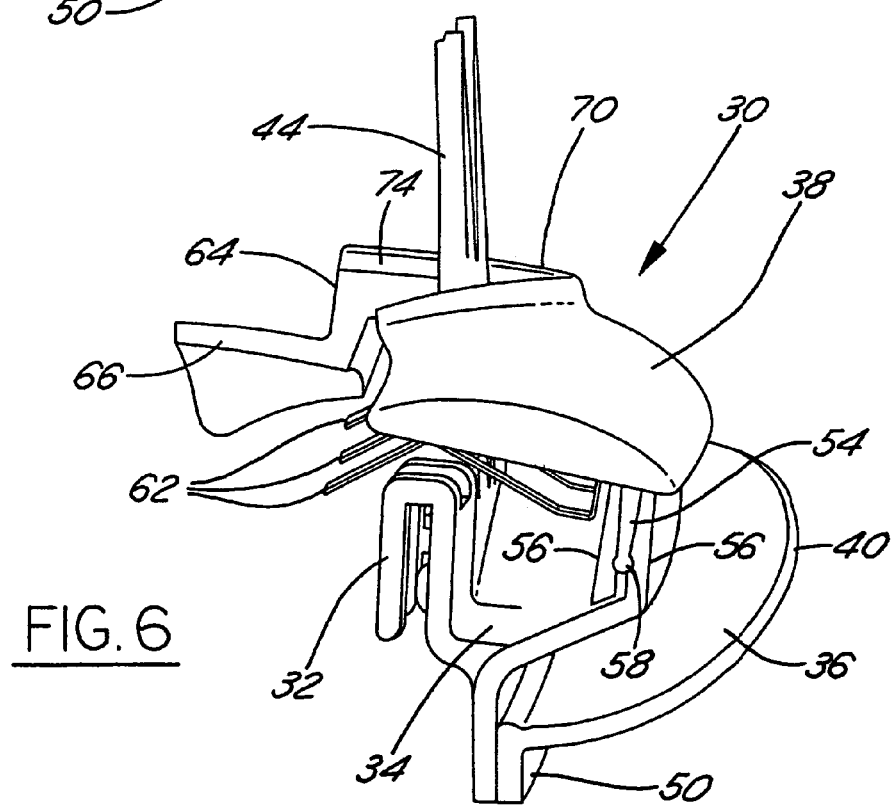
FIG. 6 is a rear end view of the close out seal.
Figure 7:
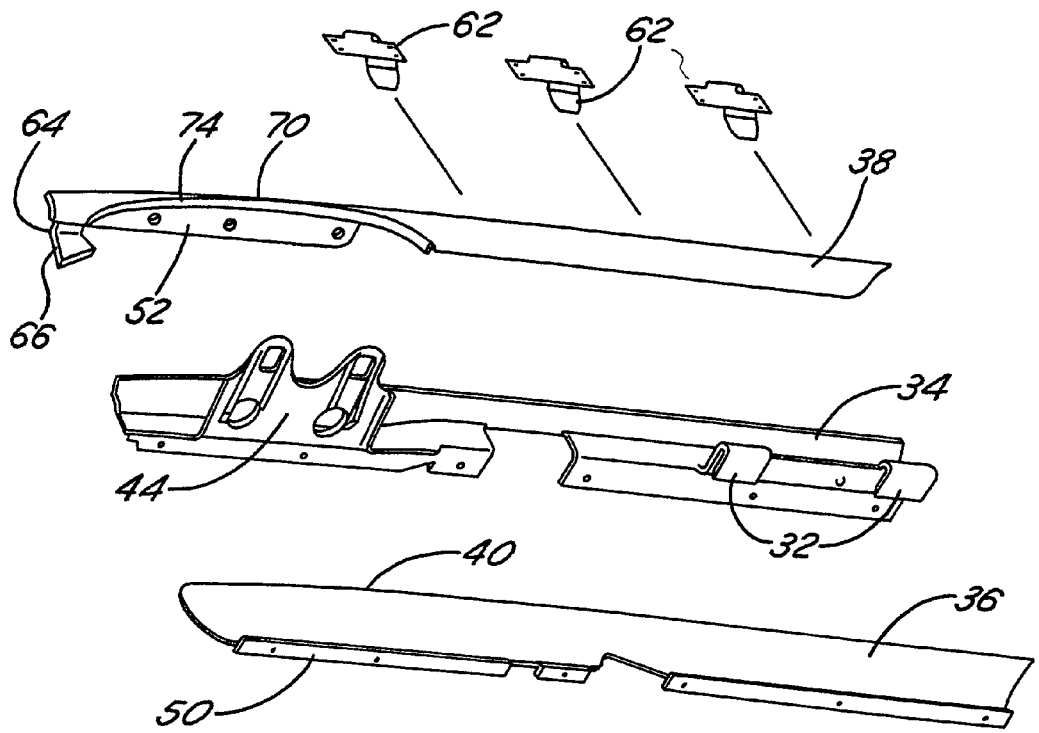
FIG. 7 is an exploded view showing the separated parts of the close out seal, namely the base, the trim strip with detached clips, and the weather strip.
Figure 8:
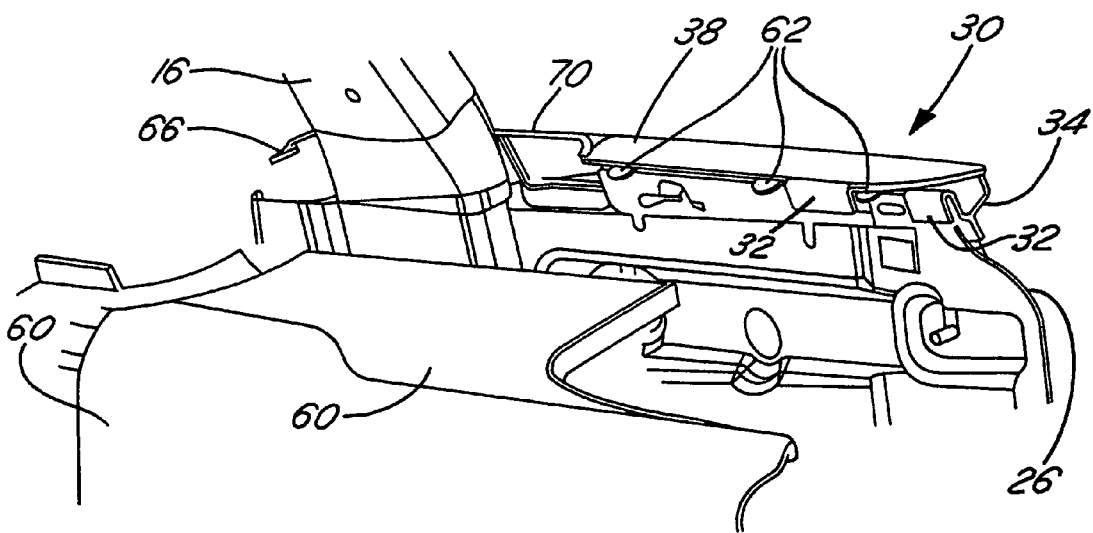
FIG. 8 is a perspective view as seen from the inside of the vehicle showing the close out seal separated from the vehicle body and an interior panel separated from the close out seal.
Figure 9:
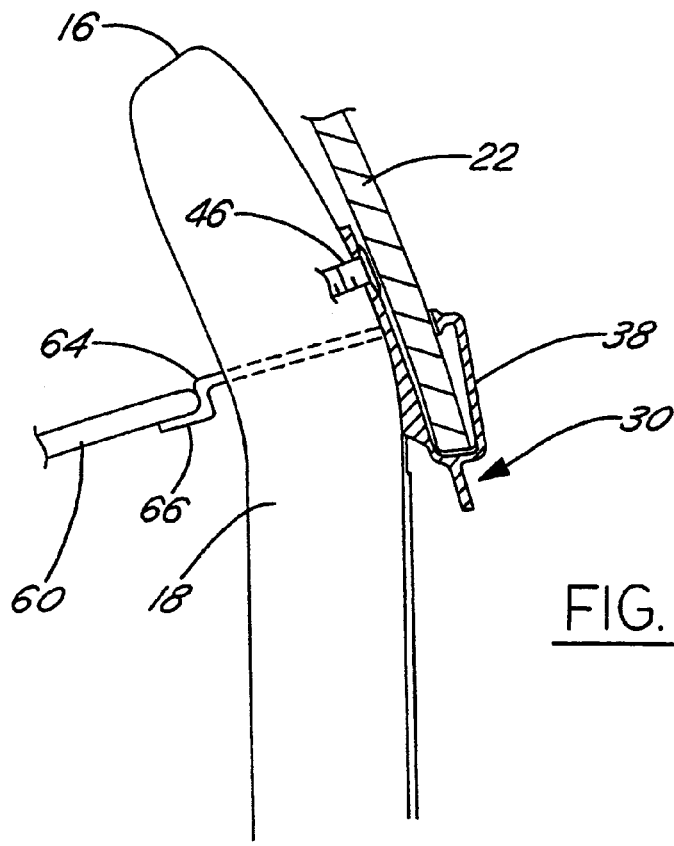
FIG. 9 is a sectional view taken on the line 9-9 in FIG. 1 showing the relationship of the close out seal to the trim cover for the sport bar.
Figure 10:
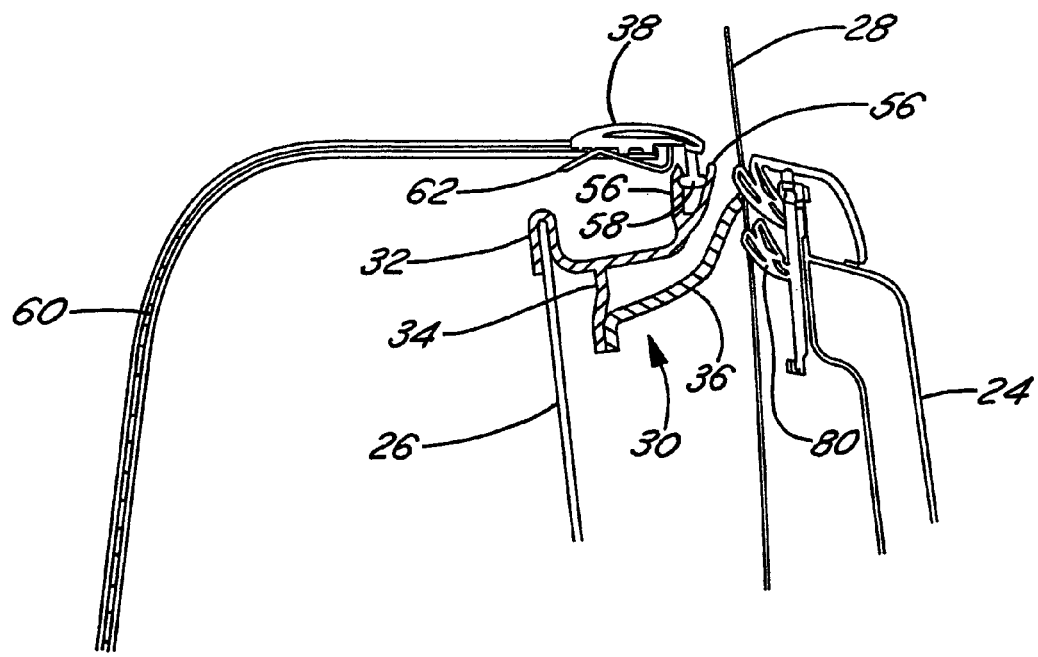
FIG. 10 is a sectional view taken on the line 10-10 in FIG. 1 showing the base of the close out seal mounted on a rigid panel inside the vehicle body, and showing clips on the trim strip attached to an interior panel of the vehicle.

Referring now more particularly to the drawings, there is shown in FIG. 1 the frame of a convertible top vehicle body 10 having rear quarter panels 12 and 14 connected by an overhead cross bar 16. The cross bar 16 is often referred to as a sport bar and is of inverted, generally U-shape having downturned end portions 18 and 20 secured to opposite sides of the vehicle body 10. A decorative trim cover 22 is applied over the sport bar along its full length.

The rear quarter panel 12 has an outer sheet metal panel 24. A rigid plate 26 is secured within the rear quarter panel, spaced laterally inwardly of the outer panel 24. The plate 26 may provide support for a window regulator (not shown) for moving the rear window 28 up and down.

A close out seal 30 has clips 32 for mounting the close out seal on supporting frame structure of the vehicle, in this instance the upper edge of the plate 26. The close out seal 30 is an elongated member that extends generally horizontally along the top of the rear quarter panel, at the inner side of the window 28. The close out seal 30 has an elongated base 34, a weather strip 36 and a trim strip 38. The base 34 and the trim strip 38 are preferably made of a suitable somewhat flexible plastic, such as polypropylene. The weather strip 36 is made of an elastomeric material such as natural rubber and has a sealing lip 40 which seals against the inner surface of the window 28.

A mounting plate 44 is secured to the base 34. Fasteners 46 extending through holes in the mounting plate attach the close out seal 30 to the sport bar. The trim cover 22 for the sport bar conceals the mounting plate 44 and the fasteners 46.

The weather strip 36 extends lengthwise of and is generally co-extensive with the base 34 and has a flange 50 which is permanently secured to the base as by heat bonding. The trim strip 38 provides a finished cap for the rear quarter panel and is a flat member which extends lengthwise of and is generally co-extensive with the base 34. One end portion of the trim strip 38, in this instance the front end portion 52, is permanently secured to the base 34 as by heat bonding. The rear end portion of the trim strip 38 is attached to the base 34 by an integral prong 54 on the trim strip which is engaged between two retention fingers 56 on the base. The fingers preferably have recesses to receive an enlargement 58 on the prong to increase the holding power of the fingers on the prong.

The rear quarter panel 12 has an interior trim panel 60 which, together with the outer sheet metal panel 24, defines the space within the rear quarter panel for the window 28. Clips 62 on the underside of the trim strip 38 releasably engage an edge of the interior trim panel. The trim strip 38 presses down and closes on the interior trim panel 60. An extension 64 on the front end of the trim strip 38 has a support pad 66 provided with a hook and loop type fastener element 68 which engages a similar fastener element on the underside of the interior trim panel 60 to hold it from pulling away.

The trim strip 38 has a curved inner surface 70 adjacent to the front end which is contoured to fit closely and seal around the trim cover 22 of the sport bar 16. The inner surface 70 is lined with a non-abrasive material 74, preferably flocked felt, is applied. The non-abrasive material is provided to prevent scratching of the trim cover 22 especially during installation.

Weather strips 80 mounted on the outer sheet metal panel 24 engage and seal against the outer surface of the window 28.

The close out seal 30 suppresses noise and dust, preventing their entry into the passenger compartment of the vehicle along the inner side of the window 28 by reason of the trim strip 38 closing on the interior trim panel 60 and the sealing lip 40 of the weather strip 36 sealing against the window. The weatherstrips 80 serve the same purpose by sealing against the outer side of the window.

It will be understood that a close out seal similar to the close out seal 30 will be provided for the outer rear quarter panel 14.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A close out seal for a rear quarter panel of an automotive vehicle, comprising:

an elongated base, an attachment on said base adapted to mount said base on supporting frame structure of the vehicle, a weather strip secured to and extending lengthwise of said base, said weather strip having a sealing lip adapted to contact a rear window of the vehicle, and a trim strip secured to said base, said trim strip extending lengthwise of said base in overlying relation to said weather strip, said trim strip having a contoured inner surface portion adapted to seal around an upright end portion of a transverse overhead sport bar, said trim strip providing a finished cap for the rear quarter panel.

2. The close out seal of claim 1, wherein said base, said weather strip and said trim strip are permanently joined together to provide a single part capable of being readily installed in the rear quarter panel.

3. The close out seal of claim 2, wherein said base has clips adapted to engage an interior trim panel of the vehicle.

4. The close out seal of claim 2, wherein said attachment comprises clips.

5. The close out seal of claim 2, wherein the contoured inner surface portion of said trim strip is lined with a non-abrasive material.

6. The close out seal of claim 5, wherein said non-abrasive material comprises felt.

7. The close out seal of claim 5, wherein said non-abrasive material comprises flocked felt, to said inner surface portion of the trim strip.

8. The close out seal of claim 2, wherein said base has first clips adapted to engage an interior panel of the vehicle, said attachment comprises second clips, the contoured inner surface portion is adjacent to an end of said trim strip and is lined with a non-abrasive flocked felt, said base and said trim strip are made of plastic and said weather strip is made of rubber.

9. The close out seal of claim 8, further including a tab on said trim strip adapted to adhere to an undersurface of the interior trim panel.

10. The close out seal of claim 9, wherein said tab is adapted to adhere to the interior trim panel by hook and loop fastener means.

* * * * *